United States Patent
Lee et al.

(10) Patent No.: US 6,795,761 B1
(45) Date of Patent: Sep. 21, 2004

(54) OVERALL CONTROL ALGORITHM FOR INTERACTIVE VEHICLE CONTROL SYSTEM

(75) Inventors: Hyeongcheol Lee, Ann Arbor, MI (US); Behrouz Ashrafi, Northville, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/449,652

(22) Filed: May 30, 2003

(51) Int. Cl.[7] .............................................. B62D 11/00
(52) U.S. Cl. ...................................... 701/41; 180/6.2
(58) Field of Search ............................. 701/41; 180/6.2

(56) References Cited

U.S. PATENT DOCUMENTS

| | | |
|---|---|---|
| 6,219,604 B1 | 4/2001 | Dilger et al. |
| 6,292,741 B1 | 9/2001 | Bitzer et al. |
| 6,393,342 B2 | 5/2002 | Bauer et al. |
| 6,415,212 B2 | 7/2002 | Nishizaki et al. |
| 6,415,394 B1 | 7/2002 | Fruehling et al. |
| 6,421,790 B1 | 7/2002 | Fruehling et al. |
| 6,424,900 B2 | 7/2002 | Murray et al. |
| 2001/0027893 A1 | 10/2001 | Nishizaki et al. |
| 2001/0029408 A1 | 10/2001 | Murray et al. |
| 2001/0032748 A1 | 10/2001 | Demerly |
| 2001/0044677 A1 | 11/2001 | Bauer et al. |
| 2002/0077782 A1 | 6/2002 | Fruehling et al. |
| 2002/0084757 A1 | 7/2002 | Ewbank et al. |
| 2002/0103939 A1 | 8/2002 | Fuehrer et al. |
| 2002/0108804 A1 | 8/2002 | Park et al. |

FOREIGN PATENT DOCUMENTS

WO   WO 01/57647 A1   8/2001

*Primary Examiner*—Yonel Beaulieu
(74) *Attorney, Agent, or Firm*—Brinks Hofer Gilson & Lione

(57) ABSTRACT

A method for controlling a vehicle, the vehicle having a steer by wire and a brake by wire system is disclosed. The method includes sensing a yaw rate, a steering wheel rate of rotation, and a throttle position. Further, the method includes comparing the yaw rate, steering wheel rate of rotation, and the throttle position to a thresholds. Thereafter, a determination is made as to whether the yaw rate, the steering wheel rate, and the throttle position is greater than, or less than the respective thresholds. An operating mode of the vehicle is changed from a nominal control mode to a performance control mode when the yaw rate is greater than a first threshold yaw rate and less than the second threshold yaw rate, steering wheel rate of rotation is greater than the threshold steering wheel rate of rotation, and the throttle position is greater than the threshold throttle position.

22 Claims, 3 Drawing Sheets

OVERALL CONTROL ALGORITHM FOR INTERACTIVE VEHICLE CONTROL SYSTEM

TECHNICAL FIELD

The present invention relates to systems and methods for controlling the stability of a vehicle and to systems and methods that provide interactive vehicle dynamic control using steer by wire and brake by wire technology.

BACKGROUND

Brake by wire and steer by wire systems have been developed and continue to be improved to replace conventional vehicle steering and braking systems. Such steer by wire and brake by wire systems have increased versatility and flexibility over standard steering and braking systems that are directly linked to driver input devices such as steering wheels and brake pedals. One of the main benefits of steer by wire and brake by wire systems is that driver inputs may be received and analyzed by a system controller to determine the most appropriate vehicle response given the road and other environmental conditions.

For example, a steer by wire system may be programmed to provide a lesser angular rotation in both magnitude and speed of a road wheel as compared to an angular rotation indicative of the driver's input on the steering wheel to protect for an under steer or over steer condition. With respect to brake by wire braking systems, for example, these systems modify the driver's braking input by decreasing or increasing braking force as well as distributing the braking force over all four road wheels to prevent slipping or skidding of the vehicle.

However, prior art steer by wire and brake by wire systems and methods have not been combined to work together to provide overall vehicle stability. For example, typical steer by wire and brake by wire systems work independently of each other to interpret a driver's input and then independently control the steerable road wheels and the vehicle brakes.

Therefore, there is a need for a new and improved system and method for combining the independent control of the steer by wire and brake by wire systems to achieve an improvement in vehicle stability and performance.

SUMMARY

Figure 1:
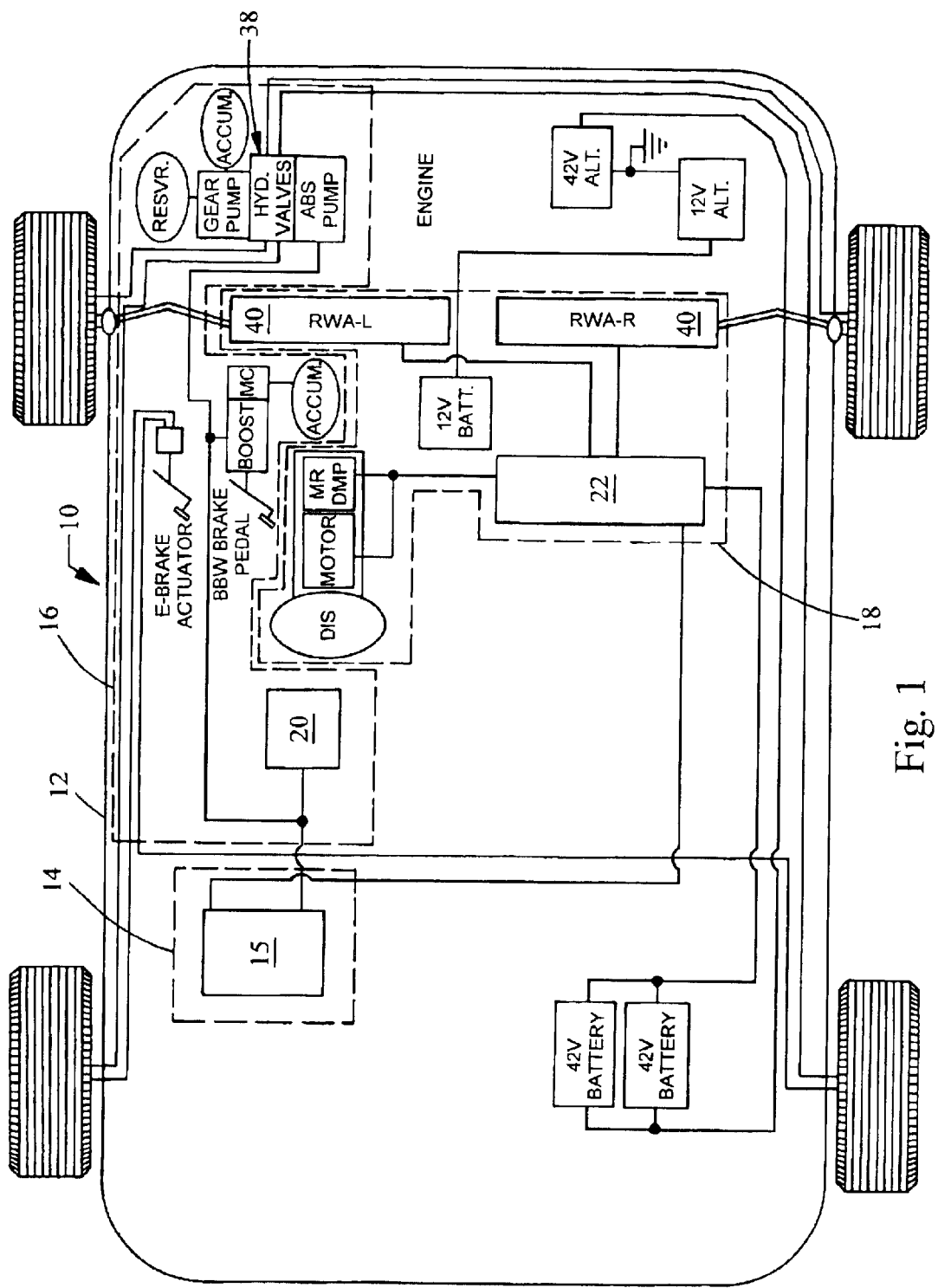
FIG. 1 is a diagrammatic representation of a vehicle control system for controlling a vehicle's stability and performance, in accordance with the present invention.

In accordance with an aspect of the present invention a method for controlling a vehicle, wherein the vehicle has a steer by wire and a brake by wire system is provided. The method includes sensing a yaw rate, a steering wheel rate of rotation, and a throttle position. Further, the method includes comparing the yaw rate to a first threshold yaw rate and to a second threshold yaw rate, comparing the steering wheel rate of rotation to a threshold steering wheel rate of rotation, and comparing the throttle position to a threshold throttle position. Thereafter, a determination as to whether the yaw rate is one of greater than the first threshold yaw rate, less than the first threshold yaw rate, and less than a second threshold yaw rate, and whether the steering wheel rate of rotation is one of greater than and less than the threshold steering wheel rate of rotation, and whether the throttle position is one of greater than and less than the threshold throttle position is made. An operating mode of the vehicle is changed from a nominal control mode to a performance control mode when the yaw rate is greater than a first threshold yaw rate and less than the second threshold yaw rate, steering wheel rate of rotation is greater than the threshold steering wheel rate of rotation, and the throttle position is greater than the threshold throttle position.

In accordance with another embodiment of the present invention the method further comprises sensing a body slip angle of the vehicle.

In accordance with yet another embodiment of the present invention the method further comprises determining a yaw rate error.

In accordance with yet another embodiment of the present invention the method further comprises comparing the body slip angle to a threshold body slip angle.

In accordance with yet another embodiment of the present invention the method further comprises comparing the yaw rate error to a threshold yaw rate error.

In accordance with yet another embodiment of the present invention the method further comprises changing the operating mode of the vehicle to a stability control mode when the yaw rate error is greater than the threshold yaw rate error and the body slip angle is greater than the threshold body slip angle.

In accordance with yet another embodiment of the present invention the method further comprises sensing faults in the brake by wire system.

In accordance with yet another embodiment of the present invention the method further comprises deactivating a brake by wire actuator when the fault has been sensed in the brake by wire system.

In accordance with yet another embodiment of the present invention the method further comprises sensing faults in the steer by wire system.

In accordance with yet another embodiment of the present invention the method further comprises deactivating a steer by wire actuator when the fault has been sensed in the steer by wire system.

In accordance with yet another embodiment of the present invention the method further comprises changing an operating mode of the vehicle from a performance control mode to a nominal control mode when the yaw rate is less than a first threshold yaw rate and less than the second threshold yaw rate, steering wheel rate of rotation is less than the threshold steering wheel rate of rotation, and the throttle position is less than the threshold throttle position.

In accordance with still another embodiment of the present invention a system for controlling a vehicle having a steer by wire and a brake by wire system is provided. The system includes a sensor for sensing a yaw rate of the vehicle, a sensor for sensing a steering wheel rate of rotation of the steering wheel of the vehicle, a sensor for sensing a throttle position of an engine of the vehicle, a controller having program code for comparing the yaw rate to a first threshold yaw rate, comparing the yaw rate to a second threshold yaw rate, comparing the steering wheel rate of rotation to a threshold steering wheel rate of rotation, comparing the throttle position to a threshold throttle position, and wherein the controller executing program code determines whether the yaw rate is one of greater than the first threshold yaw rate, less than the first threshold yaw rate, less than a second threshold yaw rate, and determines whether the steering wheel rate of rotation is one of greater than and less than the threshold steering wheel rate of rotation, and determines whether the throttle position is one of greater than and less than the threshold throttle position, and then changes an operating mode of the vehicle from a nominal control mode to a performance control mode when the yaw rate is greater than a first threshold yaw rate and less than the second threshold yaw rate, steering wheel rate of rotation is greater than the threshold steering wheel rate of rotation, and the throttle position is greater than the threshold throttle position.

DETAILED DESCRIPTION

FIG. 1 illustrates a vehicle control system 10 for controlling a vehicle 12's stability and performance, in accordance with the present invention. Vehicle control system 10 includes a supervisory subsystem 14, a brake by wire subsystem 16 and a steer by wire subsystem 18. Brake by wire subsystem 16 may be any one of a number of different brake by wire systems. For example, brake by wire subsystem 16 may be a brake by wire system as disclosed in U.S. patent application No. 2002/0084757, published on Jul. 4, 2002, herein incorporated by reference. Steer by wire subsystem 18 may be any one of a number of applicable steer by wire systems such as disclosed in U.S. Pat. No. 6,219,604 issued to Dilger et al. and assigned to Robert Bosch GmbH, herein incorporated by reference.

Supervisory subsystem 14 includes supervisory control module 15 having a microprocessor and computer memory for storing executable code for carrying out interactive vehicle dynamics control. Control logic for carrying out interactive vehicle dynamic control may be performed using hardware, software or a combination of hardware and software control logic. Brake by wire subsystem 16 includes brake by wire control module 20 having a microprocessor and computer memory for storing executable code for carrying out brake by wire control. Steer by wire subsystem 16 includes steer by wire control module 22 having a microprocessor and computer memory for storing executable code for carrying out steer by wire control.

Figure 2:
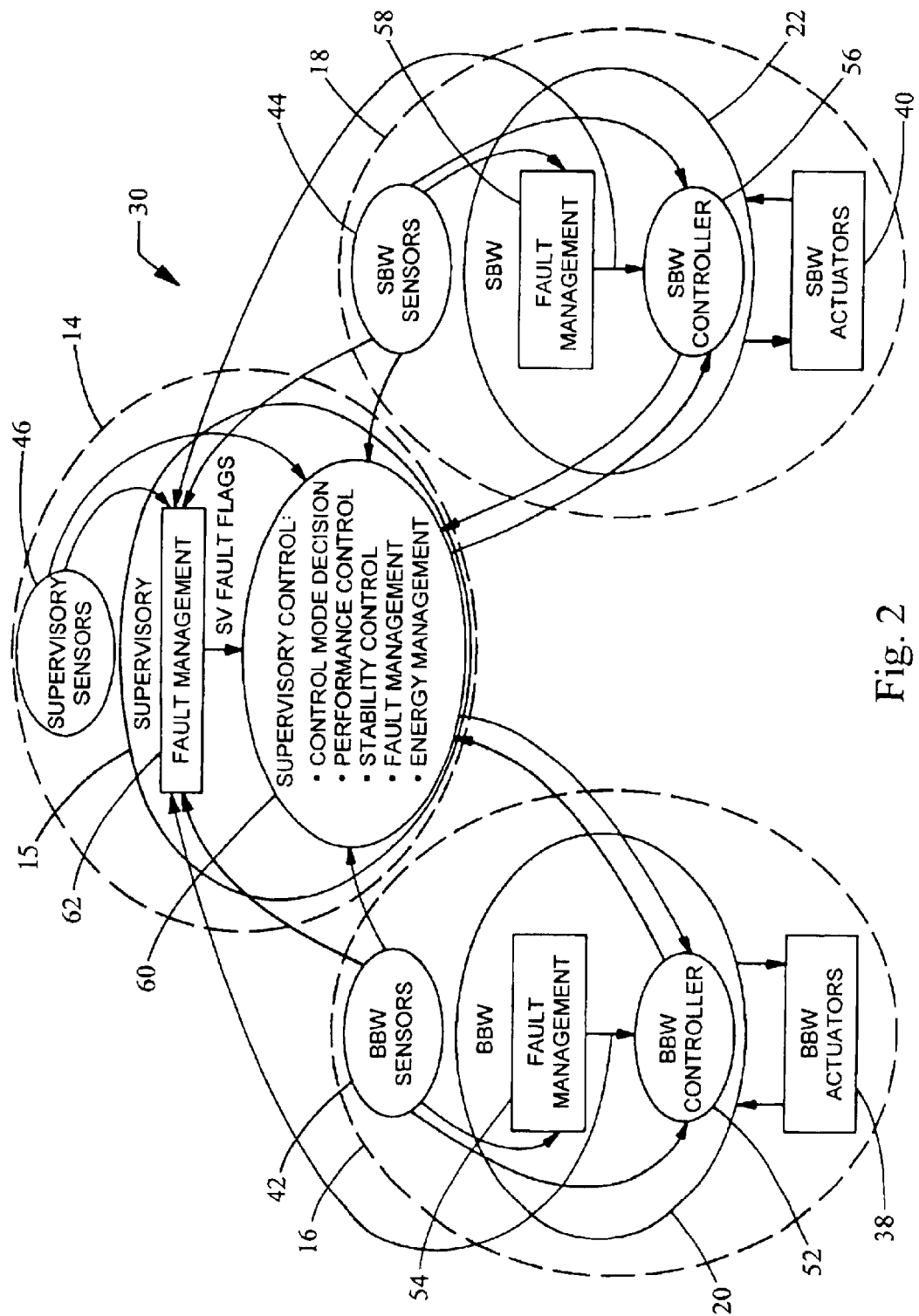
FIG. 2 is a block diagram illustrating a control architecture for carrying out vehicle interactive dynamic control implemented by a supervisory controller, in accordance with the present invention.

Referring now to FIGS. 1 and 2, a control architecture 30 for carrying out vehicle interactive dynamic control implemented by supervisory control module 15 is illustrated, in accordance with the present invention. Control architecture 30 is divided into three major control strategies: a brake by wire control, a steer by wire control and a supervisory control.

Brake by wire control is implemented through brake by wire subsystem 16. Brake by wire subsystem 16 further includes brake by wire actuators 38 and brake by wire sensors 42. Brake by wire control module 20 further includes brake by wire controller 52, brake by wire fault management controller 54, and microcontrollers and power driver (not shown in FIG. 2) which stores and executes brake by wire control and fault management program code.

In operation, brake by wire fault management 54 detects brake by wire faults, generates brake by wire fault flags, and sends fault flags to supervisory fault management 62 and brake by wire controller 52. Depending on fault types, brake by wire fault management 54 shuts down brake by wire actuator 38 by sending brake by wire fault flags to brake by wire controller 52. Brake by wire controller 52 includes a nominal brake control algorithm, which considers vehicle braking performance, without considering vehicle interactive dynamics. The outputs of the nominal brake control algorithm, $T_{b\_nom_i}$, i=1,2,3,4, where $T_{b\_nom_i}$ is nominal braking torque. $T_{b\_nom_i}$ is communicated to the supervisory controller 60. Brake by wire controller 52 also includes brake actuator controller which calculates command currents, $i_{b\_com_i}$, i=1,2,3,4, for the brake by wire actuators 38 based on the command brake torques from supervisory controller 60, $T_{b\_com_i}$, i=1,2,3,4, and the feedbacks from the brake by wire actuators 38, $T_{b\_act_i}$, i=1,2,3,4.

Steer by wire control is implemented through steer by wire subsystem 18. Steer by wire subsystem 18 further includes steer by wire actuators 40 and steer by wire sensors 44. Steer by wire control module 22 further includes steer by wire controller 56, steer by wire fault management controller 58, and microcontrollers and power drivers (not shown in FIG. 2) which stores and executes steer by wire and fault management program code.

In operation, steer by wire fault management controller 58 detects steer by wire faults, generates steer by wire fault flags, and sends fault flags to supervisory fault management 62 and steer by wire controller 56. Depending on fault types, steer by wire fault management 58 shuts down steer by wire actuators 40 by sending steer by wire fault flags to steer by wire controller 56. Steer by wire controller 56 includes the nominal steering control algorithm (You are assuming this is known!; do you have a reference (another patent, textbook or article) that discloses this type of algorithm). The nominal steering control algorithm considers vehicle steering performance, without considering vehicle interactive dynamics. The outputs of the nominal steering control algorithm, $\delta_{w\_nom_i}$, i=1,2,3,4, is communicated to the supervisory controller 60. Steer by wire controller 56 also includes a steering actuator controller which calculates command currents, $i_{b\_com_i}$, i=1,2,3,4, for the steer by wire actuators 40 based on the command steering angles from the supervisory controller 60, $\delta_{w\_com_i}$, i=1,2,3,4, and the feedbacks from the steer by wire actuators 40, $\delta_{w\_act_i}$, i=1,2,3,4.

Supervisory control is implemented through supervisory subsystem 14. Supervisory subsystem 14 further includes supervisory sensors 46. Supervisory control module 15 further includes a supervisory controller 60 and a fault management controller 62 and microcontrollers and power drivers (not shown in FIG. 2). The microcontrollers store and execute program code to carry out supervisory controller 60 and supervisory fault management 62 functions. Supervisory fault management 62 detects supervisory faults, generates supervisory fault flags, and sends fault flags to supervisory controller 60. Supervisory controller 60 includes a control mode decision algorithm that determines an appropriate control mode based on the brake by wire sensors 42, steer by wire sensors 44, supervisory sensors 46, nominal brake torque signals, $T_{b\_nom_i}$, i=1,2,3,4, nominal steering angle signals, $\delta_{w\_nom_i}$, i=1,2,3,4, and supervisory fault flags.

Supervisory controller 60 also includes a switching algorithm, performance control algorithm, the stability control algorithm, the fault management control algorithm, and energy management control algorithm. If the control mode decision (do you mean switching?) algorithm determines that the system should be in a nominal control mode, output commands of supervisory controller 60, $T_{b\_com_i}$, i=1,2,3,4 and $\delta_{w\_com_i}$, i=1,2,3,4, are the same as the nominal control outputs of the brake by wire controller 52 and steer by wire controller 56, $T_{b\_com_i}$, i=1,2,3,4 and $\delta_{w\_nom_i}$, i=1,2,3,4. If the control mode decision (switching?) algorithm determines that the system should be in performance control mode, the performance control algorithm is executed and calculates output commands of supervisory controller 60, $T_{b\_com_i}$, i=1,2,3,4 and $\delta_{w\_com_i}$, i=1,2,3,4. If the control mode decision (switching?) algorithm determines that the system should be in stability control mode, the stability control algorithm is executed and calculates output commands of supervisory controller 60, $T_{b\_com_i}$, i=1,2,3,4 and $\delta_{w\_com_i}$, i=1,2,3,4. If the control mode decision (switching?) algorithm determines "fault management mode", the fault management control algorithm is executed and calculates output commands of supervisory controller 60, $T_{b\_com_i}$, i=1,2,3,4 and $\delta_{w\_com_i}$, i=1,2,3,4. Energy management control algorithm is always executed to calculate required energy consumptions and monitors current energy level.

The control mode decision algorithm determines the appropriate control mode at a given instance based on the pre-determined decision making algorithms. The decision making algorithms account for varying sensor measurements, such as yaw rate, steering wheel angle, brake pedal travel, vehicle body slip angle, lateral acceleration, longitudinal acceleration, and throttle angle. The control mode decision algorithm actuates a nominal control mode if the nominal control mode actuation criteria are met. For example, in an embodiment of the present invention, the nominal control mode actuation criterion are:

1) yaw rate error defined by the difference between desired yaw rate and measured yaw rate, $\dot{\psi}_e$, is less than a first threshold value $\dot{\psi}_{clim1}$;

2) driver's steering wheel angular rotation, $\delta_{xwa}$, is less than a threshold value $\delta_{xwa\ lim1}$; and 3) driver's throttle input, $\theta_{throttle}$, is less than a threshold value $\theta_{throttle\ lim1}$. Therefore, nominal control mode is activated when the driver's inputs are mild and the vehicle's dynamic behavior is stable, controllable and in a linear range. In this state, there is negligible coupling between the vehicle's longitudinal and lateral dynamics therefore brake by wire subsystem 16 and steer by wire subsystem 18 are controlled separately and independently (by controller modules 22,24). In nominal control mode, supervisory control module 26 provides no interactive control and output commands of supervisory controller 60, $T_{b\_com_i}$, i=1,2,3,4 and $\delta_{w\_com_i}$, i=1,2,3,4, are the same as the nominal control outputs of the brake by wire controller 52 and steer by wire controller 56, $T_{b\_com_i}$, i=1,2,3,4 and $\delta_{w\_nom_i}$, i=1,2,3,4.

In nominal control mode, the nominal brake control algorithm included in brake by wire controller 52 calculates nominal brake torques, $T_{b\_nom_i}$, i=1,2,3,4, to track the driver's deceleration request and to perform proportional wheel brake torques front to rear for optimal braking performance; and controls the driver's brake pedal feel. At the same time, the nominal steering control algorithm included in steer by wire controller 56 calculates nominal steering angles, $\delta_{w\_nom_i}$, i=1,2,3,4, to track driver's steering request (road wheel angle control); and controls the driver's steering wheel feedback feeling.

The control mode decision algorithm actuates a performance control mode if the performance control mode actuation criterion are met. For example, in an embodiment of the present invention, the performance control mode actuation criterion are:

1) yaw rate error, $\dot{\psi}_e$, is greater than the first threshold value, $\dot{\psi}_{elim1}$, but less than a second threshold value, $\dot{\psi}_{elim2}$;

2) driver's steering wheel rate, $\dot{\delta}_{xwa}$, is greater than a threshold value, $\dot{\delta}_{xwa\ lim1}$; and 3) driver's throttle input, $\theta_{throttle}$, is greater than a threshold value $\theta_{throttle\ lim2}$. Therefore, performance control mode is activated to address aggressive driving situations such as limit handling and performance driving. While in performance control mode, the performance control algorithm is executed and calculates output commands of supervisory controller 60, $T_{b\_com_i}$, i=1,2,3,4 and $\delta_{w\_com_i}$, i=1,2,3,4, to control vehicle cornering characteristics by controlling the vehicle's over and under steer tendency, to control the vehicle's acceleration and deceleration on split road surface condition to prevent instability, to assess the feasibility of controlling the steering and braking of the vehicle while cornering to control the amount of weight transfer, and to assess the feasibility of nonparallel actuation and control of the front road wheel angles for enhanced control of the vehicle's lateral and yaw dynamics.

The control mode decision algorithm actuates a stability control mode if the stability control mode actuation criterion are met. For example, in an embodiment of the present invention, the stability control mode actuation criterion are:

1) yaw rate error, $\dot{\psi}_e$, is greater than the second threshold value, $\dot{\psi}_{elim2}$; and 2) the vehicle body slip angle, $\beta$, is greater than a threshold value, $\beta_{lim}$. Therefore, stability control mode is activated when the vehicle tends to lose or already has lost yaw stability. While in stability control mode, the stability control algorithm is executed and calculates output commands for supervisory controller 60, of $T_{b\_com_i}$, i=1,2,3,4 and $\delta_{w\_com_i}$, i=1,2,3,4, to stabilize the yaw motion of the vehicle.

If fault management control mode actuation criterion are met, the control mode decision algorithm actuates a fault management control mode to overcome and compensate for brake and steering subsystems 16 and 18 faults. There are primarily two major categories of faults. A brake subsystem fault and a steering subsystem fault. For example, in an embodiment of the present invention, a brake fault management control mode actuation criterion are command current errors, $i_{b\_com_i} - i_{b\_act_i}$, i=1,2,3,4, are larger than the threshold values, $i_{b\_lim_i}$, i=1,2,3,4, or the brake torque errors, $T_{b\_com_i} - T_{b\_act_i}$, i=1,2,3,4 are larger than the threshold values, $T_{b\_lim_i}$, i=1,2,3,4. For example, in an embodiment of the present invention, a steering fault management control mode actuation criterion are command current errors, $i_{s\_com_i} - i_{s\_act_i}$, i=1,2,3,4, are larger than the threshold values, $i_{s\_lim_i}$, i=1,2, 3,4, or the steering angle errors, $\delta_{w\_com_i} - \delta_{w\_act_i}$, i=1,2,3,4 are larger than the threshold values, $\delta_{w\_lim_i}$, i=1,2,3,4. While in the fault management control mode of steering system fault, the fault management control algorithm is executed and calculates output commands of supervisory controller 60, $T_{b\_com_i}$, i=1,2,3,4, and the steering of the vehicle will be achieved through manipulation of brake by wire subsystem 16. While in fault management control mode of brake system fault, the fault management control algorithm is executed and calculates output commands of supervisory controller 60, $\delta_{w\_com_i}$, i=1,2,3,4, and vehicle braking and steering will be achieved through the manipulation of steer by wire subsystem 18.

All of the threshold values identified in the various embodiments of the present invention depend on the type of vehicle and accuracy of sensors, and may be determined during control algorithm tuning. The threshold values may be constant values, variable values, or functions of other signals or variables. As an example, constant threshold values can be defined as follows. Except for fault mode, the threshold values are defined differently for entrance and exit of each mode to reduce high frequency mode switches around threshold values.

From nominal to performance control mode:
$\dot\psi_{elim1}$:3 deg/sec
$\delta_{xwa\ lim1}$:120 deg
$\theta_{throttle\ lim1}$:50 deg From performance to nominal control mode:
$\dot\psi_{elim1}$:2 deg/sec
$\delta_{xwa\ lim1}$:90 deg
$\theta_{throttle\ lim1}$:40 deg To stability control mode:
$\dot\psi_{elim2}$:5 deg/sec
$\beta_{lim}$:5 deg From stability control mode:
$\dot\psi_{elim2}$:4 deg
$\beta_{lim}$:4 deg To fault control mode:
$i_{b\_com_i}$, $-i_{b\_act_i}$, i=1,2,3,4:0.1*maximum current value
$T_{b\_com_i}$, $-T_{b\_act_i}$, i=1,2,3,4:0.1*maximum torque value
$i_{s\_com_i}$, $-i_{s\_act_i}$, i=1,2,3,4:0.1*maximum current value
$\delta_{w\_com_i}$, $-\delta_{w\_act_i}$, i=1,2,3,4:0.1*maximum steering angle value Energy management control algorithm is periodically executed to distribute, recover, and save electrical energy. More specifically, energy usage is monitored to assess the influence of interactivity (of brake and steering subsystems 16 and 18) on the overall energy consumption. Energy usage is, preferably, conserved through interactivity of brake by wire subsystem 16 and steer by wire subsystem 18. Energy distribution and recovery may be controlled as well.

To obtain the desired yaw rate (or desired vehicle trajectory), different methods may be used. One method uses the following equation that may be developed from a simple linear bicycle model:

$$\dot\psi_{des} \approx \frac{v_x}{C_f + l_r + K v_x^2} \delta_f \qquad (8)$$

where:
$\dot\psi_{des}$ is the desired yaw rate:
$v_x$ is the vehicle longitudinal velocity;
$\delta_f$ is the front road wheel steering angle;

$$K = m \frac{C_r l_r - C_f l_f}{C_f C_r (l_f + l_r)};$$

$C_f$ and $C_r$ are the front and rear tire cornering stiffness;
$l_f$ and $l_r$ are the distances from the vehicle center of gravity to the front and rear tire patch; and
m is the vehicle mass.

Figure 3:
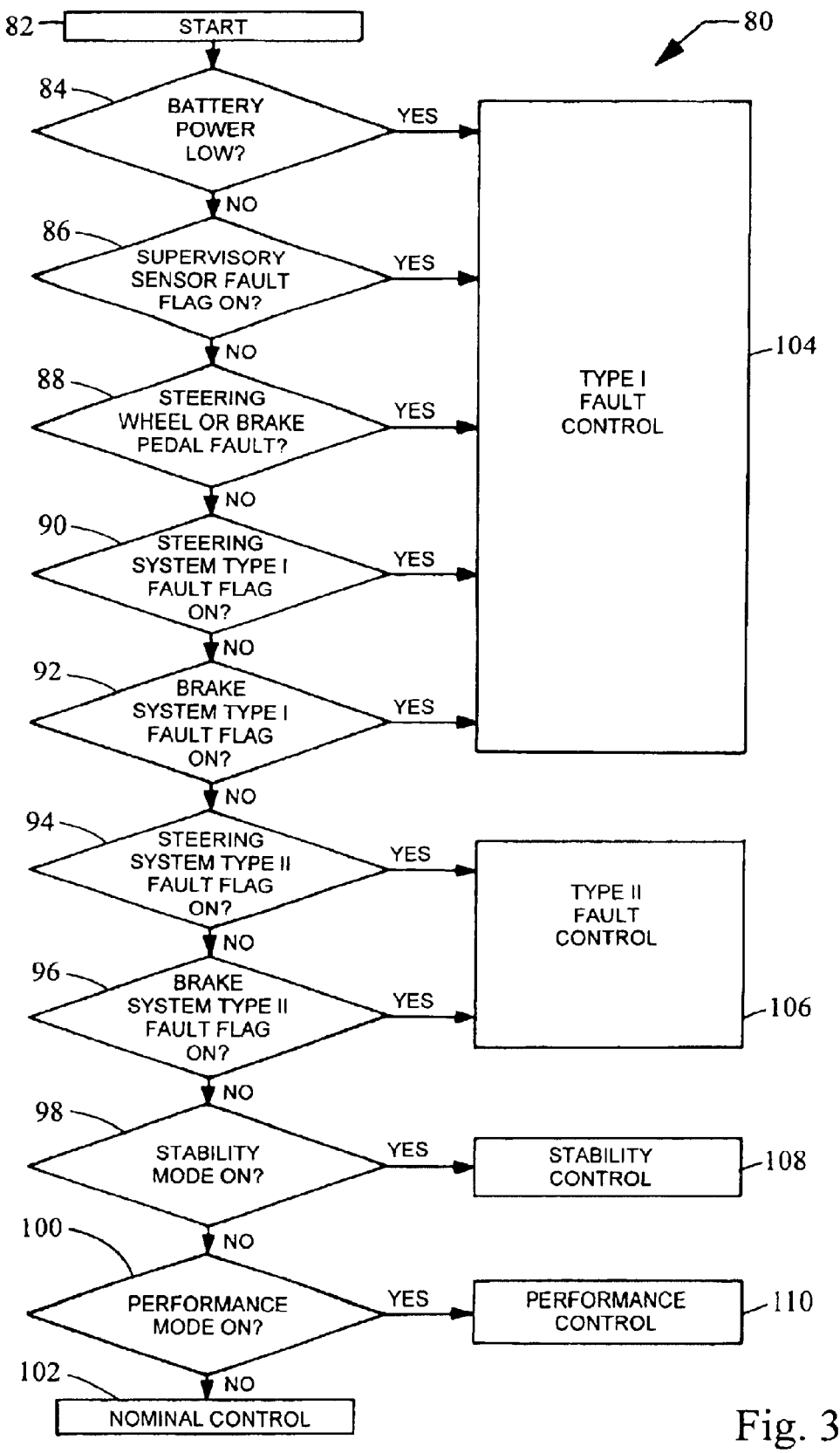
FIG. 3 is a flow chart illustrating a control mode decision algorithm, in accordance with the present invention.

Referring now to FIG. 3, a control mode decision algorithm 80 is illustrated in flowchart form, in accordance with the present invention. Control mode decision algorithm 80 determines which mode of operation (as previously specified) vehicle control system 10 will reside in. Control mode decision algorithm 80 is initiated at block 82. At block 84, battery power is checked and a determination is made as to whether a low voltage exists. A typical system voltage may be 12 or 42 volts. System voltages are monitored and a low voltage flag is generated when the voltage is lower than a threshold voltage. For example, 12V system voltage is lower than 8V, a low voltage flag is generated. If the battery power is not lower than a threshold voltage, then at block 86 a supervisory sensor flag is monitored. If at block 86 it is determined that no faults exist, then a determination is made, at block 88, as to whether there is a steering wheel or a brake pedal fault. If at block 88 it is determined that there is no steering wheel or brake pedal fault, then at block 90 a steering system type I fault (as specified below) is monitored. If it is determined at block 90 a steering system type I fault flag is not "on" (has not been set), then at block 92 a brake system fault is monitored. If at block 92 it is determined that the brake system fault flag is not "on" (has not been set) then, at block 94, a steering system type II fault flag is checked.

If, however, the battery power is below a battery power threshold, the supervisory sensor fault flag is "on", the steering wheel or brake pedal fault has occurred, steering system type I fault flag is "on", or the brake system type I fault flag is "on", then type I fault control is initiated. as represented by block 104. Type I fault control includes shutdown of the faulty parts, warning to driver, and recovery and counteraction.

If at block 94 it is determined that the steering system type II fault flag is "off", then at block 96 the brake system type II fault flag is checked. Type II fault control includes warning to driver and limited functions of the steer by wire subsystem 18 and brake by wire subsystem 16. If at block 96 the brake system type II fault flag is determined to "off", then at block 98 stability mode is checked. If at block 98 the stability mode is determined to be "off", then the performance mode is checked, at block 100. If at block 100 performance mode is determined to be "off", then the vehicle dynamic control system is placed in a nominal control mode, as indicated by block 102.

If, however, the steering system type II fault flag is "on" or the brake system type II fault flag is "on" then, as represented by block 106, the type II fault control is initiated. If stability mode is determined to be "on", then stability control is initiated, as represented by block 108. If however, at block 100, the performance control mode is "on", then at block 110, performance control is initiated.

As any person skilled in the art of systems and methods for controlling the stability of a vehicle and to systems and methods that provide interactive vehicle dynamic control using steer by wire and brake by wire technology will recognize from the previous detailed description and from the figures and claims, modifications and changes can be made to the preferred embodiments of the invention without departing from the scope of this invention defined in the following claims.

We claim:

1. A method for controlling a vehicle, the vehicle having a steer by wire and a brake by wire system, the method comprising:
 sensing a yaw rate of the vehicle;
 sensing a steering wheel rate of rotation of the steering wheel of the vehicle;
 sensing a throttle position of an engine of the vehicle;
 comparing the yaw rate to a first threshold yaw rate;
 comparing the yaw rate to a second threshold yaw rate;
 comparing the steering wheel rate of rotation to a threshold steering wheel rate of rotation;
 comparing the throttle position to a threshold throttle position;
 determining whether the yaw rate is one of greater than the first threshold yaw rate, less than the first threshold yaw rate, and less than a second threshold yaw rate;

determining whether the steering wheel rate of rotation is one of greater than and less than the threshold steering wheel rate of rotation;

determining whether the throttle position is one of greater than and less than the threshold throttle position;

changing an operating mode of the vehicle from a nominal control mode to a performance control mode when the yaw rate is greater than a first threshold yaw rate and less than the second threshold yaw rate, steering wheel rate of rotation is greater than the threshold steering wheel rate of rotation, and the throttle position is greater than the threshold throttle position.

2. The method of claim 1 further comprising sensing a body slip angle of the vehicle.

3. The method of claim 2 further comprising determining a yaw rate error.

4. The method of claim 3 further comprising comparing the body slip angle to a threshold body slip angle.

5. The method of claim 4 further comprising comparing the yaw rate error to a threshold yaw rate error.

6. The method of claim 5 further comprising changing the operating mode of the vehicle to a stability control mode when the yaw rate error is greater than the threshold yaw rate error and the body slip angle is greater than the threshold body slip angle.

7. The method of claim 1 further comprising sensing faults in the brake by wire system.

8. The method of claim 7 further comprising deactivating a brake by wire actuator when the fault has been sensed in the brake by wire system.

9. The method of claim 1 further comprising sensing faults in the steer by wire system.

10. The method of claim 9 further comprising deactivating a steer by wire actuator when the fault has been sensed in the steer by wire system.

11. The method of claim 1 further comprising changing an operating mode of the vehicle from a performance control mode to a nominal control mode when the yaw rate is less than a first threshold yaw rate and less than the second threshold yaw rate, steering wheel rate of rotation is less than the threshold steering wheel rate of rotation, and the throttle position is less than the threshold throttle position.

12. A system for controlling a vehicle, the vehicle having a steer by wire and a brake by wire system, the system comprising:

a sensor for sensing a yaw rate of the vehicle;

a sensor for sensing a steering wheel rate of rotation of the steering wheel of the vehicle;

a sensor for sensing a throttle position of an engine of the vehicle;

a controller having program code for comparing the yaw rate to a first threshold yaw rate, comparing the yaw rate to a second threshold yaw rate, comparing the steering wheel rate of rotation to a threshold steering wheel rate of rotation, comparing the throttle position to a threshold throttle position, and wherein the controller executing program code determines whether the yaw rate is one of greater than the first threshold yaw rate, less than the first threshold yaw rate, less than a second threshold yaw rate, and determines whether the steering wheel rate of rotation is one of greater than and less than the threshold steering wheel rate of rotation, and determines whether the throttle position is one of greater than and less than the threshold throttle position, and then changes an operating mode of the vehicle from a nominal control mode to a performance control mode when the yaw rate is greater than a first threshold yaw rate and less than the second threshold yaw rate, steering wheel rate of rotation is greater than the threshold steering wheel rate of rotation, and the throttle position is greater than the threshold throttle position.

13. The system of claim 12 further comprising a sensor for sensing a body slip angle of the vehicle.

14. The system of claim 13 wherein the controller further comprises program code for determining a yaw rate error.

15. The system of claim 14 wherein the controller further comprises program code for comparing the body slip angle to a threshold body slip angle.

16. The system of claim 15 wherein the controller further comprises program code for comparing the yaw rate error to a threshold yaw rate error.

17. The system of claim 16 wherein the controller further comprises program code to change the operating mode of the vehicle to a stability control mode when the yaw rate error is greater than the threshold yaw rate error and the body slip angle is greater than the threshold body slip angle.

18. The system of claim 12 further comprising a sensor for sensing faults in the brake by wire system.

19. The system of claim 18 wherein the controller further comprises program code for deactivating a brake by wire actuator when the fault has been sensed in the brake by wire system.

20. The system of claim 12 further comprising a sensor for sensing faults in the steer by wire system.

21. The system of claim 20 wherein the controller further comprises program code for deactivating a steer by wire actuator when the fault has been sensed in the steer by wire system.

22. The system of claim 12 wherein the controller further comprises program code for changing an operating mode of the vehicle from a performance control mode to a nominal control mode when the yaw rate is less than a first threshold yaw rate and less than the second threshold yaw rate, steering wheel rate of rotation is less than the threshold steering wheel rate of rotation, and the throttle position is less than the threshold throttle position.

* * * * *